US012657784B2

(12) United States Patent
Garcés et al.

(10) Patent No.: US 12,657,784 B2
(45) Date of Patent: Jun. 16, 2026

---

(54) NEURAL SYNTHESIS OF TILEABLE TEXTURES

(71) Applicant: SEDDI, INC., New York, NY (US)

(72) Inventors: Elena Garcés, Madrid (ES); Carlos Rodríguez-Pardo, Madrid (ES)

(73) Assignee: SEDDI, INC., New York, NY (US)

( * ) Notice: Subject to any disclaimer, the term of this patent is extended or adjusted under 35 U.S.C. 154(b) by 188 days.

(21) Appl. No.: 18/277,105

(22) PCT Filed: Feb. 18, 2021

(86) PCT No.: PCT/ES2021/070114
§ 371 (c)(1),
(2) Date: Aug. 14, 2023

(87) PCT Pub. No.: WO2022/175567
PCT Pub. Date: Aug. 25, 2022

(65) Prior Publication Data
US 2024/0144549 A1 May 2, 2024

(51) Int. Cl.
*G06T 11/10* (2026.01)
*G06T 7/00* (2017.01)

(52) U.S. Cl.
CPC ............ *G06T 11/10* (2026.01); *G06T 7/0002* (2013.01); *G06T 2207/20081* (2013.01); *G06T 2207/20084* (2013.01); *G06T 2207/30168* (2013.01)

(58) Field of Classification Search
CPC .................................. G06T 11/001; G06N 3/02
See application file for complete search history.

(56) References Cited

U.S. PATENT DOCUMENTS

| | | | | |
|---|---|---|---|---|
| 2012/0133779 A1* | 5/2012 | Ma | .................... | G06V 10/7715 |
| | | | | 382/164 |
| 2020/0402289 A1* | 12/2020 | Risser | ...................... | G06T 7/40 |
| 2021/0390664 A1* | 12/2021 | Pohl | ...................... | G06T 11/40 |

OTHER PUBLICATIONS

Guo et al., "MaterialGAN," ACM Transactions on Graphics, vol. 39 No. 6, Nov. 26, 2020, pp. 1-13.

(Continued)

*Primary Examiner* — Antonio A Caschera
(74) *Attorney, Agent, or Firm* — Marton Ribera Schumann & Chang LLP; Chien-Ju Alice Chuang

(57) ABSTRACT

According to various embodiments, an artificial intelligence framework capable of neural synthesis of tileable textures is provided. Using a non-tileable texture input, such as single or multi-layer texture stacks, high-quality tileable textures can be generated that match the appearance of the input samples, while increasing their spatial resolution. Embodiments are provided that leverage a latent space approach in a generative network for synthesizing seamlessly tileable textures, which can maintain semantic consistency in boundaries between tiles. A tileability metric is provided as feedback to improve and optimize the tileability of the output texture, for example using a sampling algorithm that can generate high-resolution, artifact-free tileable textures. In embodiments, a convolutional discriminator is provided for detecting artifacts in the synthesized textures by locally estimating the quality of the synthesized maps. The convolutional discriminator can also provide the feedback-based approach for optimizing an input selection process.

24 Claims, 7 Drawing Sheets

(56)                  References Cited

OTHER PUBLICATIONS

Gutierrez et al, "On Demand Solid Texture Synthesis Using Deep 3D Networks", arxiv.org, Jan. 13, 2020, pp. 1-19.

Zhou et al., "Non-Stationary Texture Synthesis by Adversarial Expansion," ACM Transactions on Graphics, Jul. 30, 2018, vol. 37, No. 4, pp. 1-13.

Fruhstuck et al., "TileGAN: Synthesis of Large-Scale Non-Homogeneous Textures", arxiv.org, Apr. 29, 2019, pp. 1-11.

International Application No. PCT/ES2021/070114, International Search Report and Written Opinion mailed Nov. 4, 2021, pp. 1-9.

* cited by examiner

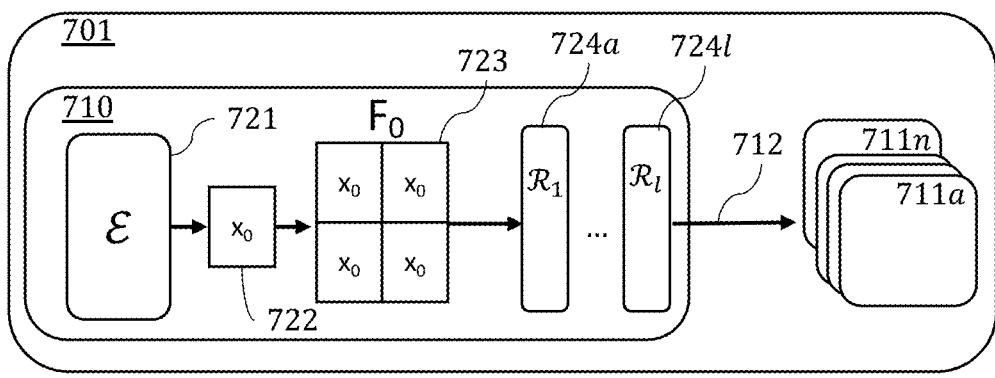
FIG. 7
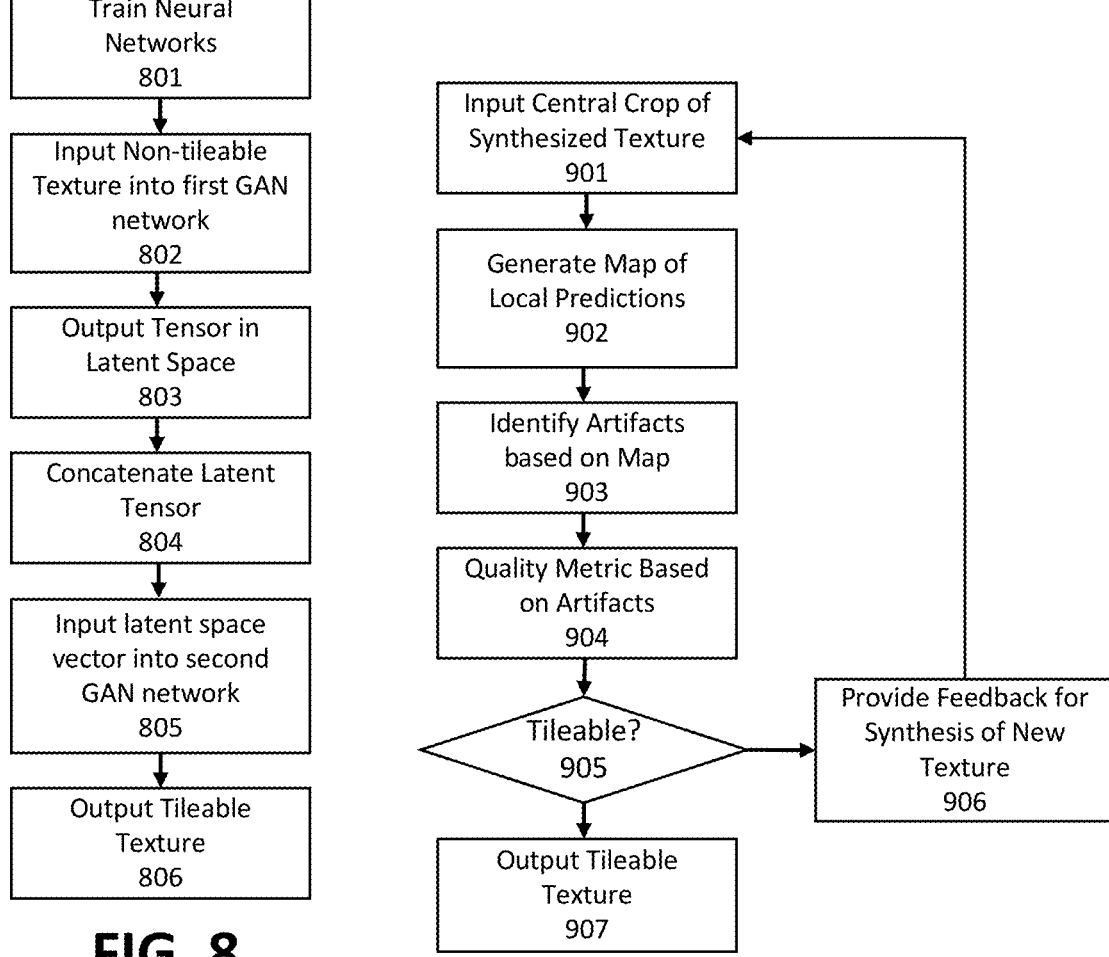
FIG. 8
FIG. 9

1105a                    1106a                    1107a

1108

1107b 1105b                    1106b 1302    1302n    1302a 1303    1303n    1303a 1304    1304n    1304a 1305    1305n    1305a

NEURAL SYNTHESIS OF TILEABLE TEXTURES

BACKGROUND

This disclosure generally relates to computer modeling systems, and more specifically to a system and method for neural synthesis of tileable textures for use in visual computing applications.

In visual computing applications, like computer graphics, high-quality and realistic textures are important elements to convey realism in virtual environments and has been a long-standing goal, and a key component for realistic animations in video games, films, and other computer-modeling applications. In general, textures are spatially-coherent 2D representations of a material used for computer models of the materials and are often used to efficiently reproduce elements with repetitive patterns such as facades of buildings or other structures and surfaces of different materials. However, the proper texture pattern must be used to avoid visual defects. Thus, the generation or synthesis of the proper textures, texture maps, texture stacks, or the like for use in computer-based texture modeling is critical.

With current approaches, textures can be procedurally generated, captured, or synthesized from real images. Some of these current approaches are described in various publications, for example, in Hu et al. [33], Guehl et al. [25], Galerne et al. [18], Gilet et al. [23], Guingo et al. [26], Heitz and Neyret [31], Guo et al. [27], Li et al. [49], Efros and Freeman [15], and Kwatra et al. [43], all of which are incorporated herein by reference in their entirety. A more general description of the state of the art in texture synthesis can be found in Akl et al. [1] and Raad et al. [57], which are also incorporated herein by reference. As seen from the literature, the primary texture synthesis approaches are based on either non-parametric or parametric algorithms.

Traditionally, non-parametric texture synthesis algorithms have worked by ensuring that every patch in the output textures is approximately equal to a patch in the input texture. Earlier methods included image quilting and sampling, e.g., Efros and Freeman [15] and Efros and Leung [16], the use graph cuts, e.g., Kwatra et al. [44], and optimization, e.g., Kwatra et al. [43] and Portilla and Simoncelli [56]. More recent approaches use variations of "PatchMatch," as described in Barnes et al. [3] and [4], as a way of finding correspondences between generated and input images. See, for example, Kaspar et al. [41], Darabi et al. [9], and Zhou et al. [70], incorporated herein by reference. Despite those methods showing high-quality results for textures of different characteristics, recent work on deep parametric texture synthesis shows better generality and scalability, requiring less manual input.

By contrast, parametric texture synthesis works by learning valuable statistics from the example textures and generating new images that match those statistics. While traditional methods used hand-crafted features, as for example illustrated by De Bonet [10] and by Heeger and Bergen [30](incorporated herein by reference), most recent parametric methods rely on deep neural networks for parametrization of the textures. Activations within deep latent spaces in pre-trained Convolutional Neural Networks (CNNs) have shown to capture relevant statistics of the style and texture of images, as for example illustrated by Gatys et al. [20] and [22], and Johnson et al. [37], incorporated herein by reference. Advances in deep perceptual metrics have allowed for the synthesis of textures using deep latent spaces as their parametrization. Textures can be synthesized through this approach by gradient-descent optimization, as for example described in Snelgrove [64] and Gatys et al. [19], incorporated herein by reference, or through training a neural network that implicitly learns those perceptual features, as illustrated by Dosovitskiy and Brox [14], which is also incorporated herein by reference.

Finding generic patterns that precisely describe the example textures is one of the main challenges in parametric texture synthesis. Features that describe textured images in a generic way are hard to find and they typically require hand-tuning. As referenced above, recent advances in Convolutional Neural Networks (CNNs) as well as Generative Adversarial Networks (GANs) have been applied into texture synthesis problems. For example, Zhou et al. [71], Frühstück et al. [17], Liu et al. [50], Bergmann et al. [5], Jetchev et al. [36], and Mardani et al. [51](all of which are incorporated herein by reference) are illustrative of these applications. Notably, GANs have shown remarkable capabilities in image generation in multiple domains, as for example illustrated in Karras et al. [39] and [40](incorporated herein by reference). GANs can be used to learn those generically descriptive features from data. Specifically, in texture synthesis, they have proven successful at generating new samples of textures from a single input image, as for example described in [5] and Zhou et al. [71], or from a dataset of images, as for example described by Frühstück et al. [17], Jetchev et al. [36], Liu et al. [50], and Mardani et al. [51]. Learning patterns from a single image has been studied in recent years in contexts different to those of texture synthesis. For example, Ulyano et al. [68] show that single images can be represented by randomly initialized CNNs, and show applicability on denoising or image inpainting problems. A similar method is proposed by Shocher et al. [63] for super-resolution. GANs trained on a single image have been used for image retargeting, as illustrated by Shocher et al. [62], or for learning a single-sample image generative model, as illustrated by Rott Shaham et al. [61]. Additionally, as noted in Asano et al. [2], single images have shown to be enough for learning low-level features that generalize to multiple problems. Ideally, a texture should be tileable, that is, when spatially concatenated, the image should not show any repeating artifacts and should keep semantically coherent transitions in the boundaries between the texture tiles. If it does, the texture is untileable. For example, an untileable texture map creates misalignments or visual defects when combined with copies of itself in at least one of its four sides. This can create a repeating distortion that when applied over a large area, like the surface of a wall, a landscape, or the outside of a building, can be highly noticeable in the ultimate visual model. Further, given the potential different resolutions at which a texture map may be applied, any misalignment between tiles at different resolutions can also create noticeable visual defects. However, synthesizing tileable textures is a very difficult problem, as it requires a semantic understanding of the particular texture properties. Due to this difficulty, in 3D digitization pipelines, for example, this process is frequently done manually by artists so that cuts, warps, or the synthesis of new elements are done coherently with respect to the contents of the texture.

Unlike generic texture synthesis, tileable texture synthesis has not received a lot of attention until recently, as for example described by Rodriguez-Pardo et al. [58], Moritz et al. [53], and Li et al. [47], incorporated herein by reference. Moritz et al. [53]propose a non-parametric approach that is able to synthesize textures from a single example while preserving its stationarity, which measures how tileable the texture is. Rodriguez-Pardo et al. [58] also leverage latent spaces in a pre-trained neural network to find the size of the repeating pattern in the input texture. Then, they use perceptual losses for finding the optimal crop of the image such that, when tiled, the texture image looks the most similar to the original image. Li et al. [47]propose a graph-cut tileable texture synthesis algorithm. They first find a patch that optimally represents the texture, then use graph cuts to transform its borders.

These approaches have been able to generate textures with different levels of regularity and a good level of realism and quality. However, these existing approaches not only remain unable to generate textures that are universally seamlessly tileable but also have only focused on synthesizing only the color properties of the textures. Textures can be provided with a greater level of realism by adding other layers or maps which represent different properties of an image, in the form of a texture stack. In rendering, synthesizing only the color information of the surfaces hinders the level of realism of the generated textures, as details such as local geometry, specularity, or transparency are lost.

Accordingly, what is needed are methods and systems for the neural synthesis of universally seamlessly tileable textures capable of synthesizing novel texture stacks addressing the deficiencies of the prior art.

BRIEF SUMMARY

According to various embodiments of the present invention, an artificial intelligence framework capable of self-supervised synthesis of tileable textures is provided. Embodiments of the present invention extend state-of-the-art texture synthesis algorithms for synthesizing textures, including multi-layer textures or texture stacks. According to embodiments, using a texture as input, high-quality tileable textures can be generated that match the appearance of the input, while increasing spatial resolution. Embodiments are provided that leverage a latent space approach in a generative network for synthesizing seamlessly tileable textures, which can maintain semantic consistency in boundaries between tiles. Using estimations as a learned perceptual-aware loss function, a sampling algorithm is provided that can generate high-resolution, artifact-free tileable textures. Additionally, a convolutional discriminator is provided for detecting artifacts in the synthesized textures by locally estimating the quality of the synthesized maps.

According to embodiments, a method for synthesizing a tileable texture of a computer model of a physical texture for visual computing applications includes the training a neural engine module to generate a texture from a non-tileable input. In embodiments, the training of the neural engine modules may be done using a single non-tileable texture stack, a dataset comprising a plurality of texture stacks, or other training inputs. The training may also be done using adversarial approach and/or may be partially of fully self-supervised. In embodiments, the training of the neural network module can include training a generative neural network by receiving a texture stack as input and learning to double the spatial extent of the input texture stack.

The method also includes processing an input texture with the trained neural engine module. The neural engine module may include a generative neural network with multiple layers, which in some embodiments may be fully convolutional. The processing in this method includes transforming a tensor output from one of the layers of the generative neural network and providing the transformed tensor as input to another layer of the network. The tensor transformation may take place between any of the intermediate layers in the neural network, taking the output from any one layer of the neural network, transforming the tensor and providing it as input to another layer that is executed after the layer from which the pre-transformed tensor was output. This method then outputs from the neural engine module a tileable texture. The method may also include evaluating the tileable texture using a tileability metric.

In embodiments, the input texture may be a non-tileable texture stack comprising one or more images with spatially-coherent information. These one or more images may include at least one of an albedo map, a normals map, a specular map, or a roughness map.

In embodiments, transforming the tensor can include optimizing the tensor within the generative neural network according to a tileability metric. In some embodiments, the tensor within the generative neural network may be a random vector. In embodiments, the tensor within the generative neural network may be a latent space representation output by the one layer of the neural network. The latent space representation output by one of the layers may be an output of a convolutional block.

In embodiments, transforming the tensor output from the one layer can include manipulating a latent space representation within the generative neural network for generating the tileable texture. In some embodiments, the method may include the optimizing of the latent space representation within the generative neural network according to a tileability metric.

In embodiments, transforming the tensor output from one of the layers can include concatenating a latent representation within the generative network once horizontally and once vertically to generate a concatenated latent space tensor, and passing the concatenated latent space tensor to the other layer as input for processing through the rest of the generative neural network to produce the tileable texture.

In some embodiments, the method can also include searching for an optimal crop of an input image to generate the input texture based on a tileability metric. In embodiments, evaluating the tileable texture using a tileability metric can include the use of a discriminative neural network as a tileability error function. The discriminative network may, in some embodiments, receive the tileable texture and output a pixel-wise estimation of a quality of the input texture. In some embodiments, central horizontal and vertical search areas within a pixel-wise estimation can be used for evaluating the quality of the input texture.

According to embodiments, the method can also include generating the input texture as a crop from an input texture stack comprising a number of texture maps. In these embodiments, the processing of the input texture can include encoding the input texture into a latent space representation and decoding the latent space representation into the tileable texture. The decoding can, for example, involve a number of decoders corresponding to the same number of texture maps in the input texture stack.

According to embodiments, a system for synthesizing a tileable texture stack of a computer model of a physical texture for visual computing applications includes a crop selection module for selecting a first area of a first image from the one or more images to generate a cropped input image. The system also includes a neural network module with generative neural networks, including a first neural network and a second neural network. The first neural network receives as input the cropped input image and generates a latent space tensor. The second neural network processes the latent space tensor into an output tileable texture map. The system may include a feedback module, coupled to the neural network module, that includes a discriminative neural network for determining artifacts in the output tileable texture map and for providing a quality loss function to determine a quality metric of the output tileable texture map. The quality metric may be fed back to the crop selection module for optimizing the selection of a second area in the first image.

BRIEF DESCRIPTION OF THE SEVERAL VIEWS OF THE DRAWINGS

FIG. 7 is a block diagram of a sample neural network module for an illustrative system for the neural synthesis of universally seamlessly tileable texture according to embodiments.

FIG. 8 is a flow chart for an illustrative method for the neural synthesis of universally seamlessly tileable texture according to embodiments.

FIG. 9 is a flow chart of a tileability metric feedback approach for an illustrative method for the neural synthesis of universally seamlessly tileable texture according to embodiments.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The above and other needs are met by the disclosed methods, a non-transitory computer-readable storage medium storing executable code, and systems for the neural synthesis of universally seamlessly tileable textures capable of synthesizing novel texture stacks in visual computer applications, including, for example, garment design and virtual modeling, motion capture applications, biomechanics and ergonomics design and simulation, education, business, virtual and augmented reality shopping, and entertainment applications, including animation and computer graphics for digital movies, interactive gaming and videos, human, animal, or character simulations, virtual and augmented reality applications, robotics, computer vision, classification and recognition applications, and the like.

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
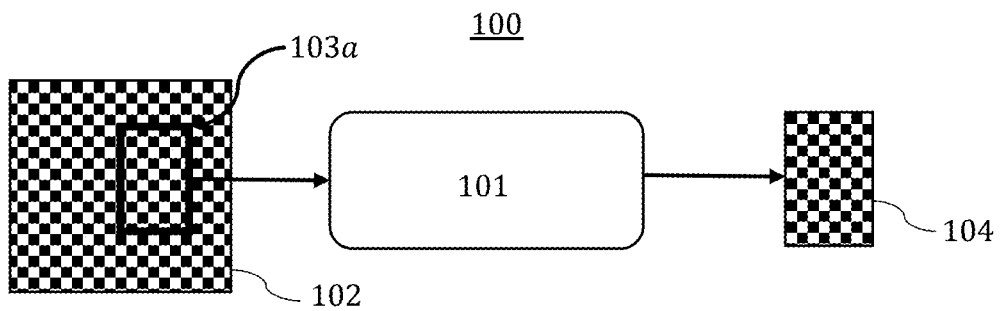
FIG. 1 is a block diagram for an illustrative system for the neural synthesis of universally seamlessly tileable texture according to embodiments.

Now referring to FIG. 1, a block diagram for an illustrative system for the neural synthesis of universally seamlessly tileable texture is provided according to embodiments. In this exemplary system 100, a neural network module 101 processes an untileable input 102 to generate a tileable texture 104. For example, in one embodiment, the neural network module 101 is fed a crop 103$a$ of a section of the input texture 102 for processing. While, for exemplary purposes the system 100 is described with a primary module 101, any number of hardware or software modules, alone or in combination with other devices, can be provided within the scope of the invention. For example, in one embodiment, modules may be software modules implemented with a computer program product comprising computer-readable media containing computer program code, which can be executed by one or more computer processors for performing any or all of the steps, operations, or processes described below. This system 100 may be specially constructed for the texture synthesis process disclosed herein, and/or it may comprise a general-purpose computing device or system for other visual application purposes that is also selectively activated or reconfigured by a computer program stored in the computer to perform the texture synthesis described herein. Such a computer program may be stored in a non-transitory, tangible computer readable storage medium, or any type of media suitable for storing electronic instructions, which may be coupled to a computer system bus or otherwise accessible to memory coupled to a processor for execution of the electronic instructions.

According to embodiments, the input 102 may comprise an untileable texture map. For example, the texture map may be provided as a representation of a surface in a format commonly used by render engines for virtual reproduction, for example, as an RGB image. The neural network module 101 is configured to take a random crop 103$a$ from the input non-tileable texture map 102. According to embodiments, the input texture map 101 can be used to train a neural network in the neural network module 101 that is then able to synthesize novel untileable texture stacks using, for example, adversarial expansion. In one embodiment, the neural network module 101 can synthesize a tileable texture map by spatially concatenating the activations of latent spaces in generative neural networks (GANs). According to embodiments, for each sample input texture, a GAN framework in a neural network module 101 can be trained and provide a generator that is able to synthesize novel examples 104 of a single sample of input texture 102. Unlike other GAN frameworks, which take as input a random vector, a GAN according to embodiments of this disclosure can crop the original input texture 102, taking a random crop 103*a* to guide the generative sampling.

For example, a neural network training framework similar to that described in Zhou et al. [71] may be used, modified as further explained below. This training framework has proven to provide state-of-the-art results on single-sample texture synthesis, surpassing previous approaches. According to these embodiments, using this neural network learning strategy can provide an implicit representation of the texture. The system 100 can then parameterize the texture representation with new untileable textures which double the spatial resolution of a given input sample. The neural network module 101 can then synthesize a tileable texture, which is provided as output 103.

Figure 2:
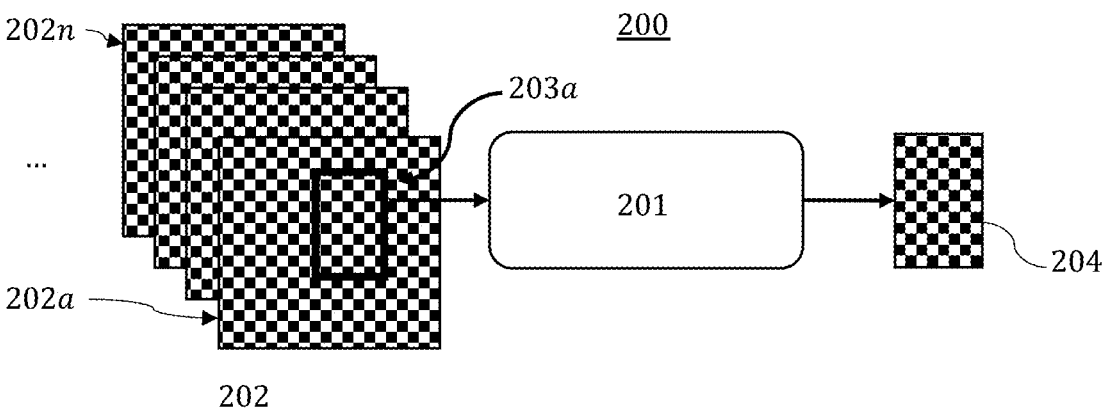
FIG. 2 is a block diagram for another illustrative system for the neural synthesis of universally seamlessly tileable texture from an input texture stack according to embodiments.

The approach described with reference to FIG. 1 can be applied to any number of different input textures, from a random input tensor to a multi-layer texture stack. For example, referring to FIG. 2, a system 200 similar to system 100 is illustrated but applied to different types of input textures. FIG. 2 is a block diagram for an illustrative system 200 for the neural synthesis of universally seamlessly tileable textures according to embodiments. The system 200 may be virtually identical to system 100 illustrated in FIG. 1. However, according to these embodiments, an input 202 may comprise an untileable texture stack $\mathcal{T}$ 202 instead of a single texture map. For example, the texture stack 202 may be provided in a layered representation of a surface, e.g., SVBRDF [6], in a format commonly used by render engines for virtual reproduction. A typical texture stack $\mathcal{T}$ 202 may be composed of one or more maps 202*a* . . . 202*n*, including for example, albedo, normals, specular, or roughness, maps among others. By way of illustration, a texture stack 202 may include an albedo 202*a* and a normal map 202*n*, among others, provided, for example, as a set of images with pixel-wise coherent information that represent a material or surface, for example a spatially varying BRDF (SVBRDF) provided as a set of RGB images of the same dimensions. Any number n of maps may be provided as part of the input texture stack 202. Obtaining a texture stack for any material on-the-wild can be easily done using conventional devices, e.g. using a smart-phone as described in Deschaintre et al. [13], incorporated herein by reference. According to these embodiments, the neural network module 201 takes a random crop 203*a* of an input texture map and processes it to synthesize a corresponding tileable texture map 204. Once all the maps 202*a* . . . 202*n* have been processed, a corresponding tileable texture stack with the same number of layers or maps 204 as the input stack 202 can be synthesized. This output, when spatially concatenated, will be seamlessly tileable, that is, the boundaries between the tiles will be smooth, maintaining semantic consistency and continuity.

Figure 3:
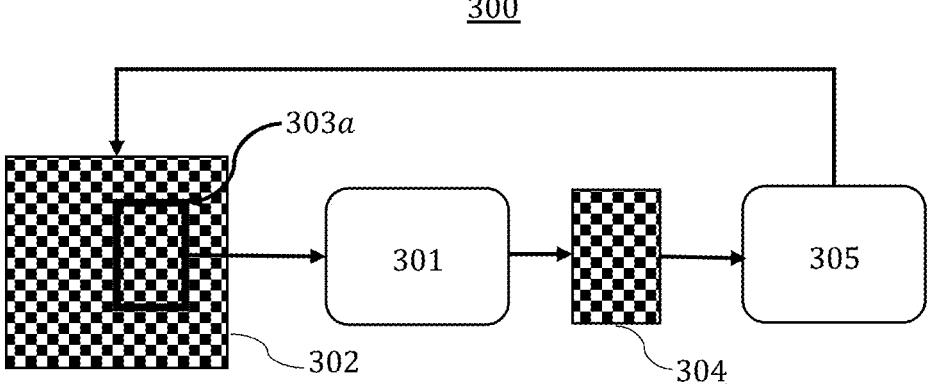
FIG. 3 is a block diagram for another illustrative system for the neural synthesis of universally seamlessly tileable texture with a tileability metric feedback according to embodiments.

Now referring to FIG. 3, a block diagram for an illustrative system 300 for the neural synthesis of universally seamlessly tileable textures according to embodiments.

According to these embodiments, the system 300 includes a neural network module 301, similar to that of the systems of FIG. 1 and FIG. 2, and, optionally, a feedback module 305. According to these embodiments, using a similar machine learning strategy can provide an implicit representation of the texture. In these embodiments, the system 300 can parameterize the texture representation in two main components: new untileable textures which double the spatial resolution of a given input sample and a quality parameter to detect if a generated stack belongs to the original distribution of the texture. In these embodiments, the output texture 304 is evaluated by the feedback module 305, for example using a tileability metric estimator. For example, the quality of the synthesized output texture 304 can be detected using a discriminative neural network as further explained below. The quality of the texture may be given, for example, by a network which predicts a tileability score. The tileability quality estimation may then be used by an optimization engine to sample different crop regions in the input texture to find an optimal cropped region. Based on the tileability metric, different random crops 303 (e.g., crop 303*a*) of the input stack 302 can be taken until an optimal tileable map 304 is generated using feedback from the optimization process. The system of FIG. 3 can operate on single texture map 302 or texture stacks similar to those illustrated in FIG. 2, untileable texture stack 202, as described above. For example, the input in system 300 may be a multi-layer SVBDF texture stack with multiple pixel-wise coherent image maps. The corresponding output would be a tileable texture stack with the same number of layer as the input texture.

Figure 4:
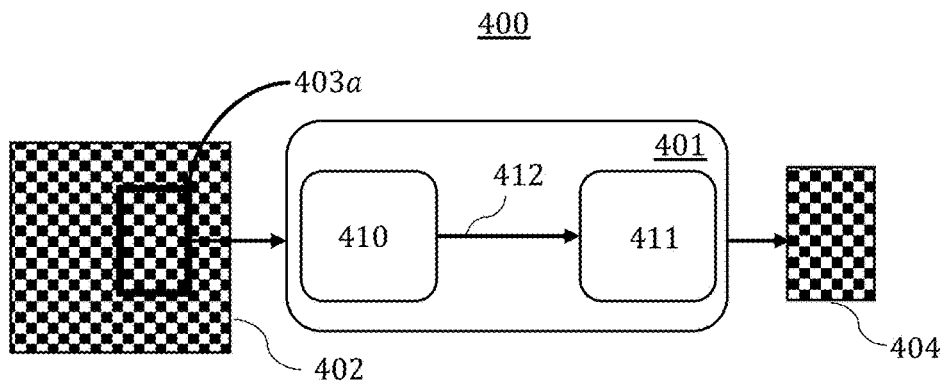
FIG. 4 is a block diagram for an illustrative system for the neural synthesis of universally seamlessly tileable texture according to embodiments.

Now referring to FIG. 4, a block diagram for an illustrative system 400 for the neural synthesis of universally seamlessly tileable textures according to embodiments. The system 400 is similar to that of the systems of FIG. 1 and FIG. 2. A neural network module 401 processes untileable texture maps 402 (e.g., random crop 404*a*) as input to generate a seamlessly tileable texture map 404. In these embodiments, the neural network module 401 may be implemented as a generator module $\mathcal{G}$ comprising an encoder $\mathcal{E}$ 410 to transform the input texture to a latent space 412 and a neural network 411 to generate a tileable texture 404 given a sample of the latent space as input 412. For example, in embodiments with generator $\mathcal{G}$ 401, the encoder ε 410 projects the untileable input texture 402 into a dense latent space $x_o$ intermediate output 412. The neural network 411 processes latent space tensor input 412 and outputs a new tileable texture 404.

Figure 5:
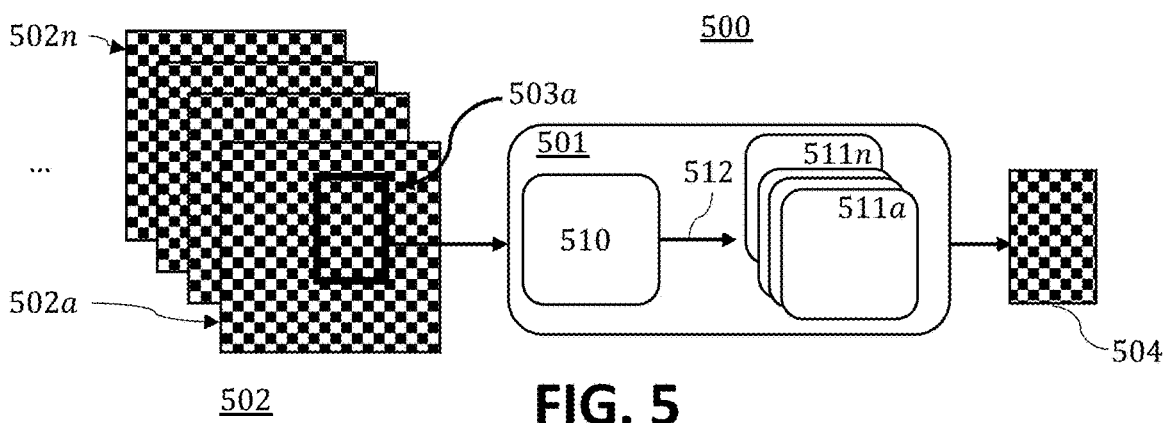
FIG. 5 is a block diagram for an illustrative system for the neural synthesis of universally seamlessly tileable texture stacks according to embodiments.

FIG. 5 is a block diagram for an illustrative system 500 for the neural synthesis of universally seamlessly tileable textures similar to that of FIG. 4, further showing implementation details for processing multi-layer texture stack inputs 502. In these embodiments, neural network module 501 may be the same as neural network module 401 in FIG. 4. However, the neural network 411 may be implemented specifically to handle multiple texture maps 502*a* . . . 502*n* in the texture stack input 502. For example, a similar generator module $\mathcal{G}$ implementation may comprise an encoder $\mathcal{E}$ 510 and a stack of decoders G 511*a* . . . 511*n*, one for each map 502*a* . . . 502*n* in the input texture stack 502. For example, the encoder $\mathcal{E}$ 510 projects a random crop of the untileable input texture 503*a* into a dense latent space $x_o$ 512. The stack of decoders G 511*a* . . . 511*n* outputs new textures $\hat{\mathcal{T}}$ 504 given a sample of the latent space.

Figure 6:
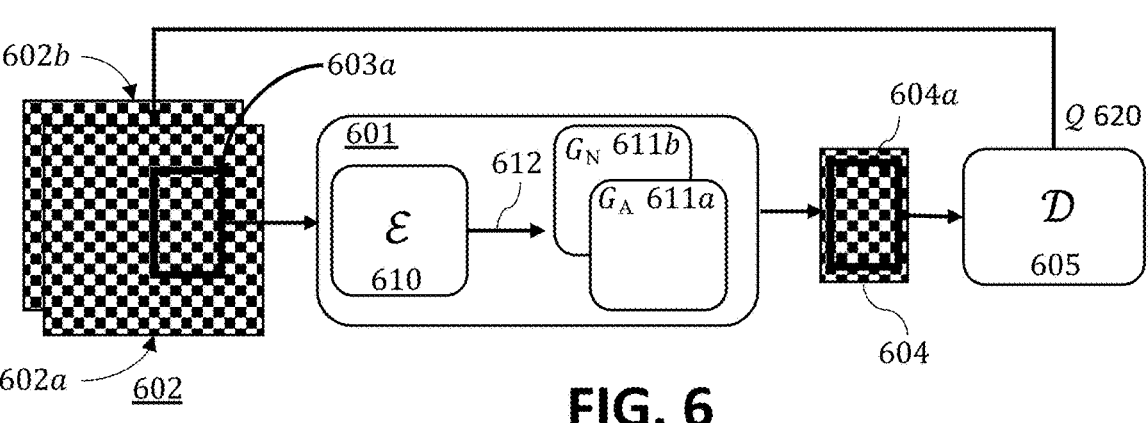
FIG. 6 is a block diagram for an illustrative system for the neural synthesis of universally seamlessly tileable texture stacks using a tileability metric feedback according to embodiments.

FIG. 6 is a block diagram for an illustrative system 600 for the neural synthesis of universally seamlessly tileable textures similar to that of FIG. 5, further adding a feedback approach similar to that illustrated in FIG. 3. According to these embodiments, the system 600 can parameterize the texture representation in two main components: new untileable textures which double the spatial resolution of a given input sample and a quality parameter to detect if a generated stack belongs to the original distribution of the texture. In these embodiments, the neural network module 601 may be implemented as a generator module $\mathcal{G}$ and the feedback module 605 may be implemented to include a discriminative network $\mathcal{D}$. In these embodiments, the output texture 604 is evaluated by the feedback module 605, for example using a tileability metric estimator. The neural network module 601 (including encoder module 610, similar to encoder $\mathcal{E}$ 410, encoder $\mathcal{E}$ 510, and encoder module 710 described herein) is first trained to synthesize textures without accounting for tileability, then leverage its latent spaces to obtain seamless textures. Then, an optimally tileable texture stack $\mathcal{T}^*$ 604 is determined by means of a sampling mechanism which leverages the latent space 612 of a trained generator $\mathcal{G}$ 602, and the fully-convolutional design of a discriminator $\mathcal{D}$ in feedback module 605.

Now referring to FIG. 7, a block diagram of a neural network module 701 according to embodiments is provided. The neural network module 701 provides an illustrative implementation that may be used for any of neural network modules 101, 201, 301, 401, 501, and 601. According to these embodiments, neural network module 701 is implemented as a generator module $\mathcal{G}$ with a generative neural network comprising an encoder module 710 and a stack of decoders G 711$a$ . . . 711$n$, one for each map in a multi-layer input texture stack $\hat{\mathcal{T}}$. The encoder module 710 includes an encoder network $\mathcal{E}$ 721 and a set of residual blocks $\hat{\mathcal{T}}_i$, 724$a$ . . . 724$l$. The neural network module 701 synthesizes a tileable texture from an untileable input texture stack $\mathcal{T}$. For example, the encoder network $\mathcal{E}$ 721 projects the untileable input texture into a dense latent space $F_0$ 723. The stack of decoders G 711$a$ . . . 711$n$ outputs new textures $\hat{\mathcal{T}}$ given a sample of the latent space.

In one exemplary embodiment, the input to neural network module 701 may be a crop t of an input texture stack $\mathcal{T}$, e.g., 602. The encoder $\mathcal{E}$ 721 transforms the input t into a latent space in a feature vector $x_0$ 722. This latent space 722 is then processed to generate latent field $F_0$ 723. For example, feature vector $x_0$ 722 may be tiled vertically and horizontally to obtain the latent field $F_0$ 723. The latent field $F_0$ 723 is the input to the residual blocks $\hat{\mathcal{T}}_i$ 724$a$ . . . 724$l$ ($i \in \{1, 1\}$). The resulting latent variables 712 are the input to the decoders G 711 which output texture $\hat{\mathcal{T}}$.

Referring back to FIG. 6, for example, two decoders $G_A$ 611$a$ and $G_N$ 611$b$ corresponding to two input layers 602$a$ and 602$b$ for an illustrative input texture stack with an albedo map and a normal map, produce 4 copies of a candidate tileable texture $\hat{\mathcal{T}}$ 604. By cropping the center part of this texture, a single of those copies is obtained with seamless borders, $\hat{\mathcal{T}}_c$ 604$a$.

In some embodiments, a feedback module 605 is provided. The feedback module 605 may be implemented as a discriminator $\mathcal{D}$. The discriminator $\mathcal{D}$ 605 receives as input the central crop $\hat{\mathcal{T}}_c$ 604$a$. Discriminator $\mathcal{D}$ 605 provides a tileability quality function $Q$ 620 as a measure of local quality of the synthesis of the output texture $\hat{\mathcal{T}}$. With this function, the Discriminator $\mathcal{D}$ 605 can provide local estimations of the quality of the synthesis. The tileability metric provided by this function $Q$ may be used by an optimization algorithm to find an optimal cropped region in the untileable input texture 602 to synthesize the tileable output texture 604. For example, the tileability evaluation function $Q$ 620 is used to analyze two vertical and horizontal search areas $s_v$, $s_h$, and detects artifacts that may arise when tiling the texture. This provides an estimate of how tileable the texture is. This estimation can be then used by a sampling algorithm for generating high-quality tileable textures.

According to embodiments, for each sample input texture, a GAN framework in a neural network module can be trained and provide a generator that is able to synthesize novel examples $\hat{\mathcal{T}}$ 604 of a single sample of input texture stack $\mathcal{T}$ 604. Unlike other GAN frameworks, which take as input a random vector, a GAN according to embodiments of this disclosure can crop the original input texture stack $\hat{\mathcal{T}}$ 601, taking a random crop t 603$a$ to guide the generative sampling, such that, $\hat{\mathcal{T}} = \mathcal{G}(t)$ for $t \in \mathcal{T}$. This GAN framework builds upon the work of Zhou et al. [71] which uses adversarial expansion to train the network. For example, in one embodiment, a target crop $t_c$ 603$a \in \mathcal{T}$ of 2 k×2 k pixels is first selected from the input stack $\hat{\mathcal{T}}$ 602. Then, from that target crop $t_c$ 603$a$, a source random crop $t_s \in t_c$ is chosen with a resolution of k×k pixels. The goal of the generative network is to synthesize $t_c$ given $t_s$. Using this approach, the generative neural network can learn to increase the spacial extent of the input texture, for example it can be doubled. In this and other embodiments, this learning approach may be fully self-supervised. The generative model is trained alongside a discriminator $\mathcal{D}$, which learns to predict whether its inputs are the target crops $t_c \in \mathcal{T}$ or the generated samples $\hat{\mathcal{T}} = \mathcal{G}(t)$.

Now referring to FIG. 8, a flow chart illustrating a method for the neural synthesis of universally seamlessly tileable textures according to embodiments is provided. This method is capable of generating seamlessly tileable textures or texture maps by spatially concatenating latent spaces in generative adversarial networks (GAN).

According to embodiments, the method involves training a GAN 801 using, for example, a technique called adversarial expansion. For training, a single sample of the texture is sufficient but the training input could be extended to multiple samples or a dataset of textures. For example, in one embodiment training may be done with a dataset comprised of a plurality of texture stacks. The trained GAN generates new samples that are tileable of a given input texture using generative learning techniques. The GAN can generate these textures using, for example, a convolutional neural network (CNN). A first network of the GAN takes as input 802 the texture (or optionally a random vector) and outputs 803 a tensor in a latent space. The method generates 805 tileable texture maps by vertically and horizontally concatenating 804 a latent tensor output from the first network. The generated activations are passed to a second network in the GAN. The second network of the GAN takes a vector in a latent space as input 805 and outputs 806 a tileable texture map image. For example, the central area of the output of the second network can cropped to obtain the tileable texture map that is provided as output. In embodiments, the second network can be composed, for example, of multiple sub-networks, one per each layer in input the texture maps.

Now referring to FIG. 9, a flow chart illustrating a method for the neural synthesis of universally seamlessly tileable textures according to embodiments is provided. Methods according to these embodiments can optionally supplement the method of FIG. 8 by providing a feedback mechanism to improve the quality of the output tileable texture maps. The method illustrated in FIG. 9 may use a discriminative neural network as a quality loss function capable of locally measuring the quality of the synthesized tileable texture, and then predicting a score about the tileability of a texture. This discriminative neural network can be trained during training the GAN in step 801 of the method of FIG. 8. Once the discriminator is trained, the method begins with the output of the method of FIG. 8, taking as input 901 a central crop of the synthesized texture. Then, a 2-D map of local predictions of the quality of the synthesized textures is obtained 902, for example using the discriminator. The local predictions are then used to look for artifacts 903 in the areas in the borders of the tiled textures. Measuring the artifacts 904 in the borders of the texture with respect to the rest of the texture can provide a determination 905 whether the texture is tileable or not, for example using a threshold value, a quality measure value, or the like. The determination can be provided as feedback 906 for selection of another random crop in the input texture. Once a high-quality tileable texture is determined 905, the method outputs 907 the tileable texture.

Neural Network Modules

According to embodiments, a system for tileable texture synthesis includes a neural network module (as illustrated by 101, 201, 301, 401, 501, 601, and 701 in FIGS. 1-7) and may also include a feedback module (as illustrated by 405 and 605 in FIGS. 4 and 6 respectively). The neural network module may comprise an encoder-decoder generator $G$ with residual connections. The feedback module may comprise a convolutional discriminator $\mathcal{D}$. In these embodiments, so as to be able to synthesize textures of multiple different sizes, the network may be designed to be fully-convolutional. For example, an architectural design similar to that of [71] can be followed and improved according to this disclosure. For example, building on recent advances on style transfer algorithms, Instance Normalization [66] may be applied before each PReLU [28]non-linearity operation in the neural networks. This allows to use normalization for training the networks without the typical artifacts caused by Batch Normalization [7, 12, 67, 54]. Additionally, in order to allow for the synthesis of multiple texture maps at the same time, the generator architecture may be modified as described herein.

Referring back to FIG. 7, according to embodiments, the generative architecture for neural network modules may be implemented with three main components: An encoder $\mathcal{E}$ 721, which comprises the information of the input texture t into a deep latent space 722 $x_0 \leftarrow \mathcal{E}$ (t), with half the spatial resolution of the input texture. A set of residual blocks 724a . . . 724l $\hat{\mathcal{F}}_i$, i∈{1, 1}, which learn a compact representation of the input texture $x_i < \hat{\mathcal{F}}_i(x_{i-1}) + x_{i-1}$. Then a stack of decoders G 711a . . . 711n, that transforms the output 712 of the last residual block $\hat{\mathcal{F}}_l$ 724l into an output texture $\hat{\mathcal{T}} \leftarrow G(x_l)$. Residual learning allows for training deeper models with higher levels of visual abstraction [29], while shortcut connections between layers enhance local details of the generated images [59, 34].

According to embodiments, synthesizing a texture stack of multiple maps with a single generative model, as illustrated for example in FIG. 5, poses extra challenges over the single map case of FIG. 1. Each map 502a . . . 502n represents different properties of the surface, such as geometry or color, resulting in visually and statistically different images. This suggests that independent generative models per map could be needed. However, the texture maps must share pixel-wise coherence, which is not achievable if multiple generative models are used. Instead, embodiments according to this disclosure use a generative model 501 that learns a shared representation of all the texture maps, as for example illustrated by other work on intrinsic image decomposition, e.g., [35], [69], and [48](incorporated herein by reference), but has different decoders 511a . . . 511n for each of the texture maps 502a . . . 502n. Specifically, a stack of decoders, G 511a . . . 511n is trained, one for each map of the input stack. For example, in the illustrative system 600 of FIG. 6, decoders {$G_A$ 611a, $G_N$ 611b} are trained for each input map, albedo 602a and normal 602b maps, in the input stack 602.

As one of ordinary skill in the art will realize, there are many options available for the implementation of systems and methods according to this invention. Specifically, for neural network modules in the embodiments described, in order to synthesize texture stacks using a single generator, it is desirable to preserve both the low-level details of each of the texture maps and to maintain the local spatial coherence between them; if this coherence is lost, computer renderings that use the synthesized maps will likely show artifacts or look unrealistic. Accordingly, design options based on different assumptions on how the synthesis should be learned taking into account the particular semantics and purpose of each map are preferred. Now referring to FIG. 12A and FIG. 12B, block diagrams of alternative architectures for generators according to this disclosure are provided. Both networks have approximately the same number of trainable parameters.

Figure 12A:
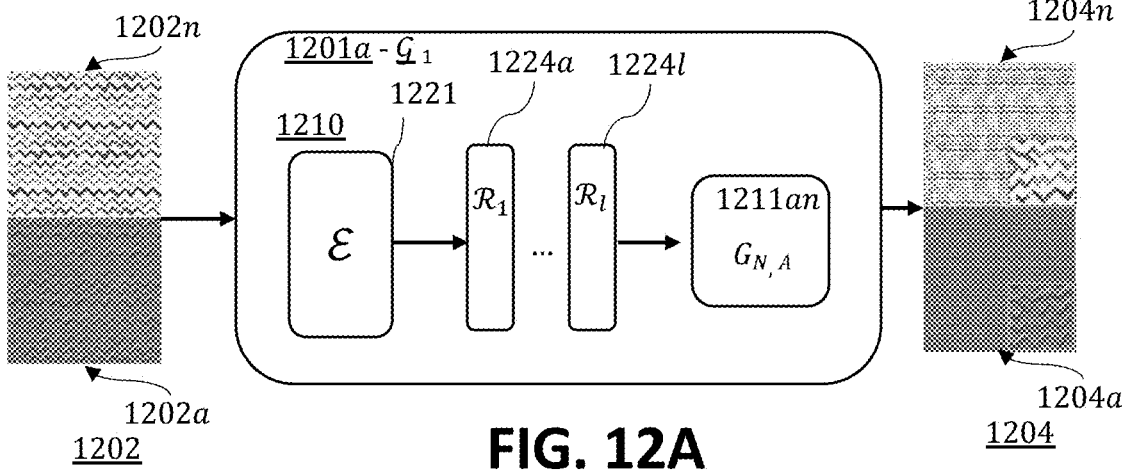
FIG. 12A is a block diagram of an alternative architecture for a generator in a sample neural network module for an illustrative system for the neural synthesis of universally seamlessly tileable texture according to embodiments.

The generator architecture $G_1$ 1201a, in FIG. 12A, treats the input texture stack 1202 as a multiple channel input image, and entangles every texture map in the same layers. It assumes that the maps in the stack, 1202a (albedo) and 1202n (normal) share most of the structural information and, as such, there is no need to generate them separately. Thus, the last layer in the decoder 1211an outputs every texture map. The second architecture $G_2$, in FIG. 12B, 1201b includes notions of intrinsic image decomposition and finds a shared representation of each texture map 1202a and 1202n, but has a separate decoder 1211a and 1211n for each of them. As such, the residual blocks 1224a . . . 1224l are shared for all the texture stack, but each decoder 1211a and 1211n can be optimized for the semantics of each particular map 1202a, 1202n. Architectures $G_1$ 1201a and $G_2$ 1201b may include encoder module 1210 comprising an encoder network $\mathcal{E}$ 1221, all of which may function the same as, or similarly to, the corresponding components in FIG. 7.

Figure 12B:
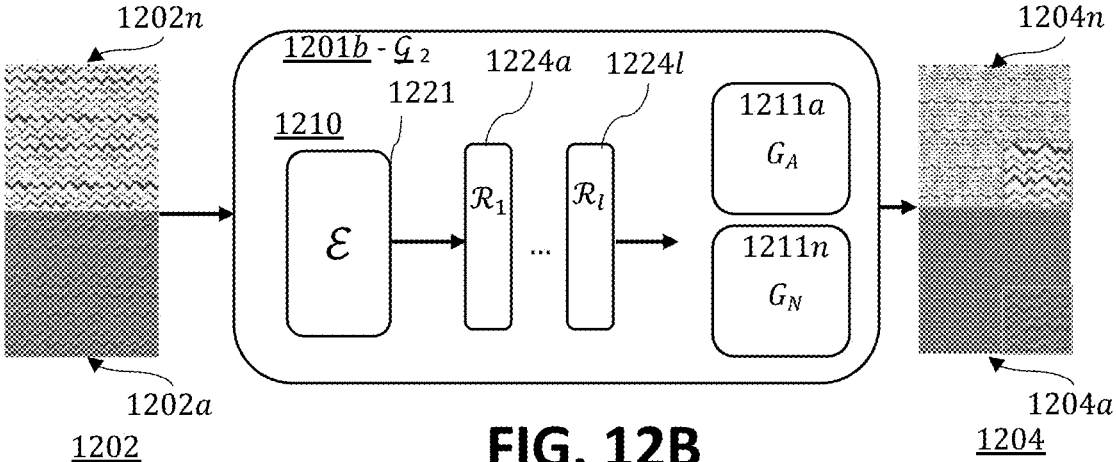
FIG. 12B is a block diagram of another alternative architecture for a generator in a sample neural network module for an illustrative system for the neural synthesis of universally seamlessly tileable texture according to embodiments.

A qualitative comparison between both models can be seen from their corresponding output 1204 comprising output maps 1204a-1204n. As can be seen, particularly in the zoomed in regions at the bottom right of each output map 1204, the quality of the output texture of the design architecture of FIG. 12B provides the best results. This architecture allows for a more stable and efficient training, without losing the pixel-level coherence between maps. The architecture of FIG. 12A shows more artifacts and homogeneous synthesized albedos in its output 1204 than the output of FIG. 12B, most likely due to the fact that the generation parts of the network are not fully separated. While in some embodiments and adversarial expansion framework may be used, alternative neural network approaches can be used within the scope of this disclosure. For example, while adversarial expansion embodiments are powerful, the same neural architecture is used for every texture. However, in some embodiments different choices on the architecture can make different assumptions on the nature of the textures. For example, as described in [52](incorporated herein by reference) different approaches to neural architecture search may provide different optimal neural architectures to use for each texture. Furthermore, in alternative embodiments, each texture synthesis network does not need to be trained from scratch. This training can be computationally costly. Instead, learning to synthesize one texture may help in the synthesis of other textures, as shown for example shown by [50] (incorporated herein by reference). A similar approach can be applied to training the neural networks of different modules according to this disclosure.

Similarly, while embodiments described above rely on the manipulation of latent spaces within the generative model, in other embodiments, explicitly training the network to generate tileable textures may also provide suitable results. In addition, in other embodiments, pre-processing the input texture images so they are more easily tileable can help the synthesis. Many textured images do not meet the conditions for tileability (as described in [8]) that help the generation of seamless textures (e.g., fronto-planarity, lack of artifacts, etc.). Thus, pre-processing these images before the synthesis can be used in embodiments to improve the overall performance. For example, in some embodiments, the pre-processing may include automatically rotating the textures so their repeating patterns are aligned with the axes, as for example described in [58](incorporated herein by reference), or removing artifacts in the input, as for example described in [11](incorporated herein by reference).

Feedback Modules

According to embodiments, a system for tileable texture synthesis may also include a feedback module (as illustrated by 305 and 605 in FIGS. 3 and 6 respectively). Feedback modules may be implemented as discriminative networks, as for example described in [34], [45], and [71](incorporated herein by reference). For example, a discriminator $\mathcal{D}$ may be implemented based on a PatchGAN architecture. A discriminator $\mathcal{D}$ according to these embodiments classifies the probability for small patches of the input image, instead of providing a single estimation of the probability of the whole image being real. This architecture has several advantages. First, it provides local assessments on the quality of the synthesized textures, which may be exploited to obtain high-quality textures. Second, this fully-convolutional architecture provides some control on what kind of features are learned by the discriminative neural network. For example, by adding more deep layers to $\mathcal{D}$, the generated textures are typically of a higher semantic quality, but lose details that may be beneficial to preserve. A detailed study on the impact of the depth of $\mathcal{D}$ can be found on [71].

As one of ordinary skill in the art will appreciate, in some embodiments, the discriminator $\mathcal{D}$ is capable of detecting local artifacts but provides less control for separating such artifacts and global semantic errors. In other embodiments, alternative discriminative models, as for example described in [60](incorporated herein by reference) may be implemented.

Loss Function

The networks used for the modules in systems according to this disclosure may be trained following a standard GAN framework, as for example described in [24](incorporated herein by reference). The training process can iterate between training $\mathcal{D}$ with a real sample texture stack $\mathcal{T}$ and a generated sample $\hat{\mathcal{T}}$. In some embodiments of this disclosure, the adversarial loss function $\mathcal{L}_{adv}$ may be extended with three extra loss terms:

$$\mathcal{L}_1^a, \mathcal{L}_1^n,$$

and $\mathcal{L}_{style}$; corresponding respectively to the pixel-wise distance between the generated and target albedo, normals, and a perceptual loss, as for example described in [21] (incorporated herein by reference). The total style loss is weighted by weighting different layers in the same way described in [58], [71], and [21](incorporated herein by reference). Thus, the global loss function according to these embodiments can be defined according to Eq. 1:

$$\mathcal{L} = \lambda_{adv}\mathcal{L}_{adv} + \lambda_{\mathcal{L}_1^a}\mathcal{L}_1^a + \lambda_{\mathcal{L}_1^n}\mathcal{L}_1^n + \lambda_{style}\mathcal{L}_{style} \qquad \text{[Eq. 1]}$$

As one of ordinary skill in the art will appreciate, in alternative embodiments different loss functions can be implemented within the scope of this disclosure. For example, in some embodiments a perception loss function such as that described in [32](incorporated herein by reference) may be implemented.

Latent Space Tiling

According to some aspects of embodiments of this disclosure, after training, a generator $\mathcal{G}$ is able to synthesize novel samples of a texture given a small exemplar of it. Although these novel samples duplicate the size of the input, they are not tileable by default. It has been shown, for example in [17](incorporated herein by reference), that by spatially concatenating different latent spaces in a ProGAN [38] generator, it is possible to generate textures that contain the visual information of those tiles while seamlessly transitioning between the generated tiles. Referring back to FIG. 7, in some embodiments the first latent space $x_0$ 722 is spatially repeated (horizontally and vertically) within the generative model, obtaining a latent field $F_0$ 723. This field $F_0$ 723 is passed through the residual layers $\hat{\mathcal{T}}_i$ 724a . . . 724l and the decoders G 711a . . . 711n, to get a texture stack, $\hat{\mathcal{T}}$, that contains four copies of the same texture, with seamless transitions between them. A seamlessly tileable texture stack $\hat{\mathcal{T}}_c$ is obtained by cropping the central region (for example with an area of 50% of $\hat{\mathcal{T}}$). The predicted texture $\hat{\mathcal{T}}$ has 4×4 the resolution of the input t. Thus, after the cropping operation, $\hat{\mathcal{T}}_c$ has twice the resolution of the input stack $\mathcal{T}$.

Figures 10A, 10B, 10C, 10D:
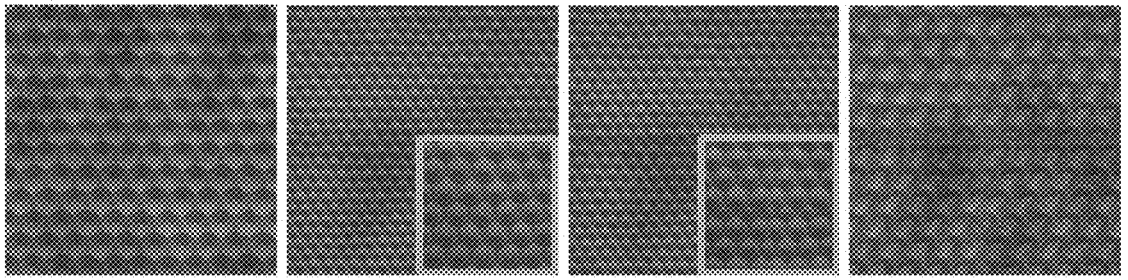
FIG. 10A is an image illustrating an input texture according to embodiments.
FIG. 10B-10D are images illustrating output textures according to embodiments using different split levels.

Referring now to FIG. 10A-10D, according to an aspect of some embodiments, the level l at which to split the generative process is selectable. FIG. 10A shows an illustrative input texture t. FIG. 10B shows an illustrative output texture $\hat{\mathcal{T}} = \mathcal{G}$ (t), using split level l=0. The lower corner shows an enlarged, zoomed-in, crop of the center of the image. FIG. 10C shows another illustrative output texture $\hat{\mathcal{T}} = \mathcal{G}$ (t) for the same input t but using split level l=3. The lower corner shows an enlarged, zoomed-in, crop of the center of the image. FIG. 10D shows another illustrative output texture $\hat{\mathcal{T}} = \mathcal{G}$ (t) for the same input t but using split level l=5. As illustrated in FIGS. 10A-10D, generating the latent field $F_l$ early layers (l=0) generates the best visual results, later layers either create small artifacts (l=3) (e.g., as shown in FIG. 10C) or generate unrealistic textures (l=5) (e.g., as shown in FIG. 10D). Thus, generating the latent field $F_0$ by tiling earlier levels of the latent space forces the network to transform F more times, thus resulting in more seamlessly tileable textures. Generating this latent field at earlier levels of the latent space (l∈{0, 1}) yields the best visual results. Thus, the output of the encoder $x_0 = \hat{\mathcal{T}}$ (t) is tiled before transforming it by the residual blocks $\hat{\mathcal{T}} R_i$.

Discriminator-Guided Sampling

Figure 11A:
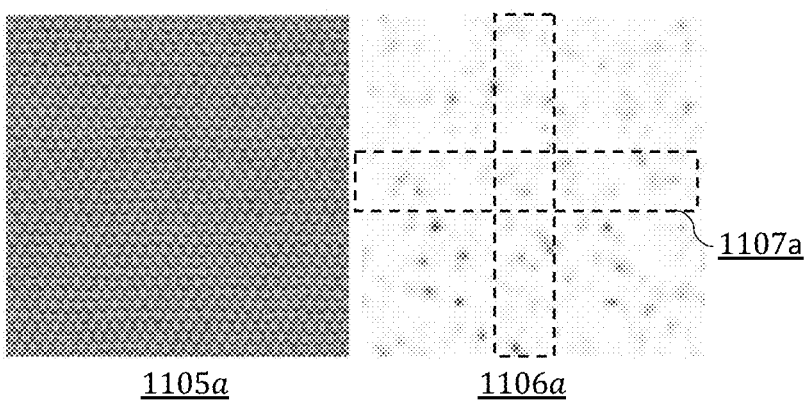
FIG. 11A-11B are exemplary output texture maps with corresponding artifact maps according to embodiments.
Figure 11B:
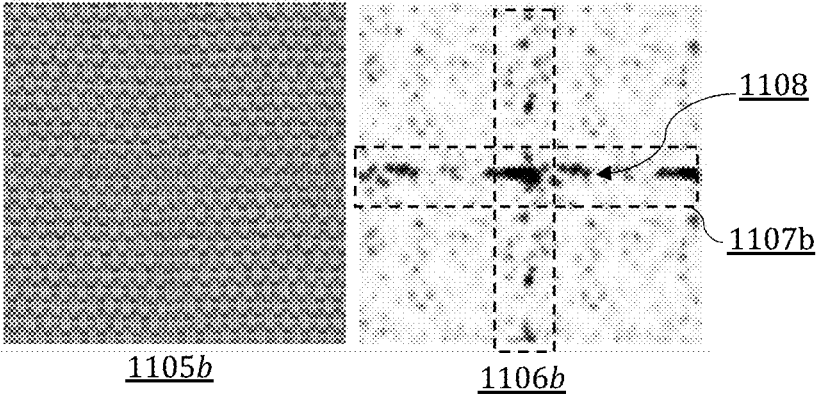

According to another aspect of embodiments of this invention, the tiling of the latent space is provided to generate an output tileable texture stack that is a continuous function, with smooth transitions between the boundaries of the tiles. However, for a texture to be compelling when rendered, it should also preserve certain properties of stationarity. In contrast to the algorithm provided in [17], where the latent spaces are drawn from random vectors, the latent spaces according to embodiment of this disclosure can be densely encoded representations of input textures. The selection of the input that the network receives plays a role on the quality of the output textures. For example, FIG. 11A and FIG. 11B show output albedo maps $\hat{\mathcal{T}} = \mathcal{G}$ (t) 1105a and 1105b from different quality input maps t and t' respectively. The figures also show a corresponding artifact maps $\mathcal{D}(\hat{\mathcal{T}})$ 1106a and 1106b, highlighting the edge search areas 1107a and 1107b (see FIG. 9 discussion above). As shown by comparing these two artifact maps 1106a and 1106b not all the generated textures are equally valid. While the higher quality input texture t results in an essentially artifact-free albedo map 1105a, an input texture of lower quality t' results in significant artifacts 1108 in the search areas of the resulting albedo map 1105b. The selection of the input texture can be posed as an optimization problem: t*=argmax $_{Q} Q(\mathcal{G}$ (t)), where the goal is to find the crop t* that maximizes the quality $Q$ of the generated texture $\mathcal{G}$ (t)= $\hat{\mathcal{T}}_c$. The nature of this problem makes it possible to have multiple valid generated stacks. Using this approach, the sampling mechanism of embodiments of the systems disclosed herein can obtain a high quality texture using a minimal number of operations.

Sampling

According to another aspect of embodiments of the disclosure, a fully-convolutional GAN implementation allows the system to generate textures of any sizes. A factor to consider which can limit the size of the output textures is the hardware used for each implementation. This is a benefit provided by embodiments of this disclosure to provide tileable texture synthesis as, even if a given texture is seamlessly tileable, larger textures require less repetitions to cover the same spatial area, which ultimately results in fewer repeating artifacts. According to embodiments, there are some issues to consider when finding tileable textures. For example, the input texture needs to contain the distribution of the existing repeating patterns and the input tile itself must not create strong artifacts when tiling the latent spaces of the generator. Some existing approaches can estimate the repeating pattern size, but they are limited to regular repeating patterns, which are not common in real-world textures.

According to this aspect of the disclosure, it is desirable to find the largest possible tileable texture stack. To do so, multiple candidate crops can be sampled for a given crop size c∈ℕ. Using a tileability evaluation function $Q$, we can measure if the generated textures are seamlessly tileable. If, for a given crop size, a seamlessly tileable texture cannot be found, the size of the crop can be updated. According to embodiments, crop sizes can be updated in a decreasing fashion in unit quantities. We sample crops of sizes in the range of c∈{$c_{min}$, $c_{max}$}. By first sampling textures at the largest possible size c=$c_{max}$, this procedure allows provides large tileable texture stacks. The output of embodiments of the sampling algorithm is thus the first generated texture $\mathcal{T}^*$ that is estimated to be tileable by $Q(\mathcal{T}^*)$.

Discriminator-Guided Quality Function

According to another aspect of embodiments of the disclosure, one component of the sampling strategy discussed above is the quality functions $Q$ that may be used to determine if a stack is tileable or not. As for example illustrated in FIG. 11B, artifacts appear on vertical and horizontal frames 1107b around the center of the textures. This is likely caused by strong discontinuities or gradients on the same areas of the tiled latent spaces, which the rest of the generative network fails to transform into realistic textures. Following recent work on generative modeling [60] (incorporated herein by reference), a discriminator $\mathcal{D}$ according to embodiments of this disclosure may be implemented as a semantic-aware error metric that can be exploited for detecting local artifacts in the generated textures. This can be done with a global loss function that contains pixel-wise, style, and adversarial losses, as for example proposed above. The adversarial loss learns the semantics of the texture, whereas the other components of the loss functions model color distances or repeated pattern activations. As such, in these embodiments, the discriminator $\mathcal{D}$ learns a disentangled representation of the semantic properties of the textures, without accounting for perceptual or color properties.

According to these embodiments, a quality evaluation function $Q$ is provided that estimates if the generated texture stack $\hat{\mathcal{T}}_c$ is tileable, looking for artifacts on a central area, $\mathcal{S} \in \mathcal{D}(\hat{\mathcal{T}}_c)$ of the discriminator. This area is composed of two regions, $\mathcal{S} = \mathcal{S}_v \cup \mathcal{S}_h$, where $\mathcal{S}_v$ is a vertical area, and $\mathcal{S}_h$ is an horizontal area, both centered on the output of the discriminator, as illustrated by search areas 1107 in FIG. 11A and FIG. 11B. In these embodiments, the function $Q$ can be based on an output of 0 from discriminative network $\mathcal{D}$ when it determines a high probability that a patch is synthetic. However, as otherwise the values are unbounded and sample-dependent, a threshold τ∈ℝ can be established using the values of the rest of the image as a reference $\tau = \gamma$ min($\mathcal{S}_r$), where $\mathcal{S}_r = \mathcal{D}(\hat{\mathcal{T}}_c) \cap \mathcal{S}$ is the remaining part of the image, and γ∈ℝ is a threshold that allows to control the sensitiveness of $Q$. Thus, in these embodiments, $Q(\hat{\mathcal{T}}_c)$ is 1 if min($\mathcal{S}_v$) and min(Sh) are smaller than τ, considering the texture as tileable, and 0 otherwise.

Exemplary Implementation Embodiment

The following is a description of an exemplary implementation embodiment according to this disclosure. As one of ordinary skill in the art recognizes, these are exemplary values that in no way limit the scope of the invention but rather provide an illustrative implementation from the many possible implementations that are possible given the teachings of this disclosure.

As a preliminary matter, according to this implementation embodiment, for the neural networks of this implementation a batch size of 1, and an input size of k=128 can be used. All weights are initialized by sampling a $\mathcal{N}$ (0, 0.02). In this embodiment, $\mathcal{G}$ has l=5 residual blocks $\hat{\mathcal{T}}_i$, and is comprised of 5 convolutional layers, with a Sigmoid operation at the end. A stride of 2 can be used for the downsampling operations in $\hat{\mathcal{F}}$ and transposed convolutions for upsampling in the decoders G. The loss function given in Eq. 1 is used and each part of the loss function is weighted as: $\lambda_{adv}=\mathcal{L}_{style}=1$, and $$\lambda_{\mathcal{L}_1^a} = \lambda_{\mathcal{L}_1^n} = 10.$$

The networks are trained for 50000 iterations using Adam [42](incorporated herein by reference), with an initial learning rate of 0.0002, which is divided by 10 after iterations 30000 and 40000. The models are trained and evaluated using a single NVIDIA GeForce GTX 1080 Ti. Training may take from a few minutes to a few hours. For example, in one implementation, training was completed in about 40 minutes. But even if training takes several hours for each texture stack, once the network is trained, it can generate new samples in milliseconds. PyTorch [55](incorporated herein by reference) can be used as the learning framework. The input textures are typically of around 500×500 pixels.

For this illustrative embodiment, the latent space is tiled at its earliest possible level ($F_l$, l=0), as it provides the best quality results. For identifying the tileability of textures, a search area $\mathcal{S}$ is used spanning 20% of each spatial dimension of the textures. To ensure maximal quality, a threshold $\gamma=1$ can be used. The values for $c_{min}=100$ pixels, m=3 and $c_{max}$ as the resolution of the whole input texture. This means that for the level of $c_{max}$, only one texture is sampled.

Figure 13A:
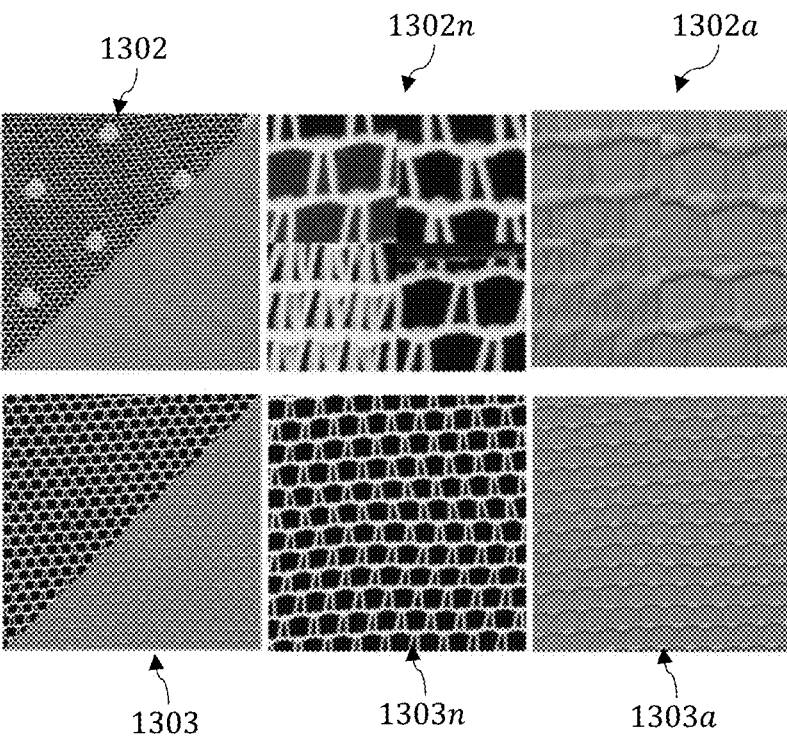
FIG. 13A-13B are a set of images illustrating results of the tiling of synthesized texture maps according to one embodiment compared with results of naïve tiling.
Figure 13B:
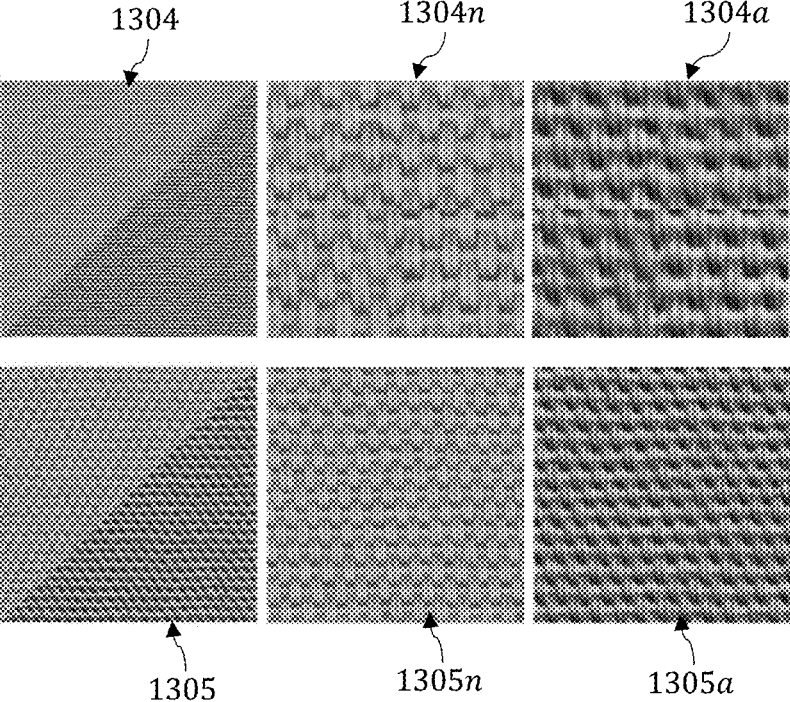

Now referring to FIG. 13A and FIG. 13B, results of the tiling of synthesized texture maps 1303 and 1305 are compared to the naïve tiling of the corresponding input texture maps 1302 and 1304 respectively. The input textures 1302 and 1303 and the corresponding synthesized tileable output textures 1303 and 1305 include albedo and normal maps, the albedo and normal maps are shown on each of two halves of each of the images displayed along a diagonal center line, normal map being the top-left half and albedo the bottom-right. In FIG. 13A, images 1302n and 1302a show a center crop of the input texture 1302 tiled twice horizontally and vertically using the normal map in 1302n and the albedo map in 1302a. The corresponding 2×2 tiled center crops 1303n and 1303a based on the synthesized texture stack 1303 are shown in FIG. 13A for comparison. FIG. 13B shows a similar comparison for another input texture stack 1304, with normal map 1304n and albedo map 1304a, and the corresponding center crops 1305n and 1305a based on the synthesized version 1305. As shown in these results, in the top rows of FIG. 13A and FIG. 13B, naively tiling the input texture does not produce seamless transitions at the boundaries while tiling the synthesized textures provides seamless results. The approach for synthesizing tileable textures used in the exemplary embodiment performs better for regular textures, being inherently limited by the capabilities of the adversarial expansion technique to learn the implicit structure of the given texture. For example, the synthesis of the dotted texture in the input stack 1302 of FIG. 13A shown in 1303 fails to reproduce the larger dots, as they are very scarce, but the remaining structure is very well represented. This shows that if the input does not show enough regularity, the adversarial expansion approach may fail to reproduce any low regularity patterns. However, based on other experimental results, this approach can generate very compelling performance for other challenging inputs such as an image of a stack of bananas or of a field of flowers, which are greatly irregular, or an image of a woven fabric exhibiting non-uniform illumination.

Figure 14:
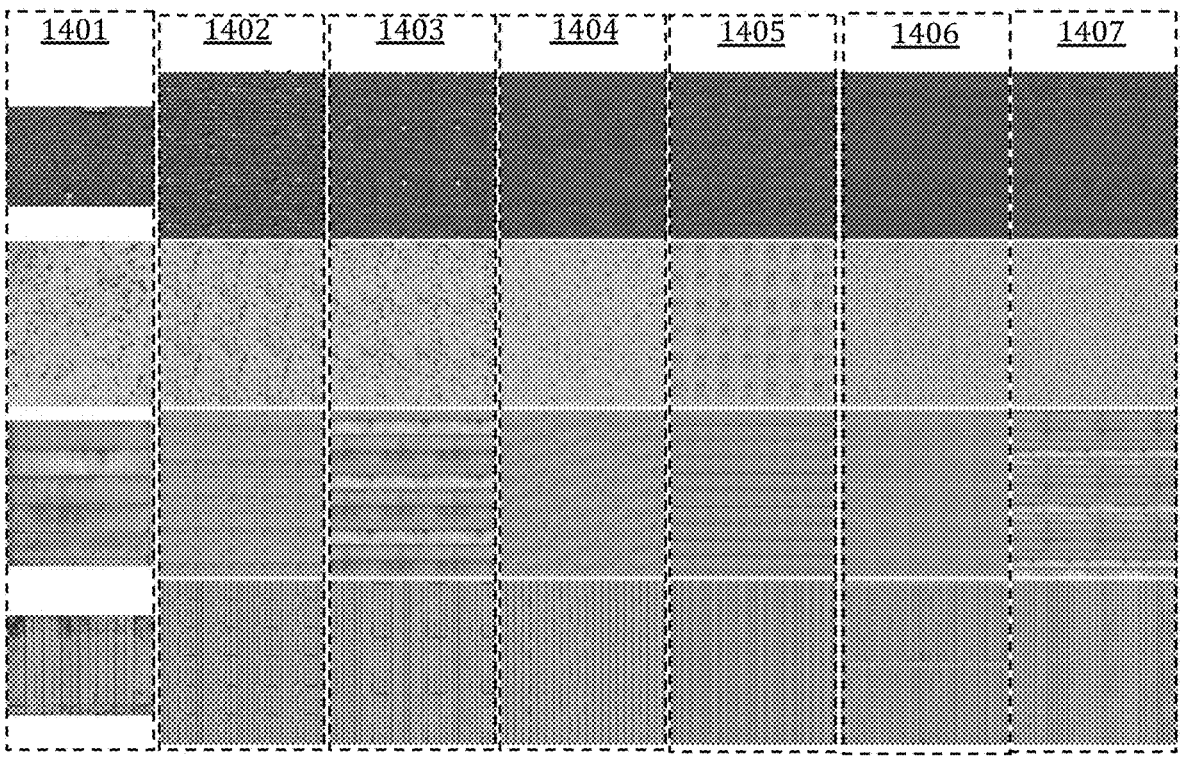
FIG. 14 is a table of images illustrating synthesized textures using various approaches as compared to the synthesized results according to one embodiment.

Now referring to FIG. 14, images of input texture maps and corresponding synthesized textures using various approaches are provided for comparison. Images of the input textures 1401 are provided in the first column. Then synthesized textures for each input image are shown in the subsequent columns. The sample images 1401 were obtained from [53] (incorporated herein by reference) as the dataset for comparing the different approaches. For comparison purposes, given the limitations on existing approaches, only color maps were used. FIG. 14 provides a comparison of the synthesis results 1407 according to the illustrative implementation embodiment of this invention to other approaches in parametric and non-parametric texture synthesis. The results 1402 are based on a synthesis algorithm which is not intended to generate tileable textures: Image Quilting, proposed by Efros et al. [15], and fails to generate natural-looking textures. Similarly, the results 1406 are also for a synthesis algorithm that is not intended to generate tileable textures, the parametric work by Zhou et al. [71]. This approach creates artifacts when tiling its outputs. The results 1403 are based on Li et al. [47], which uses Graph-Cuts for generating seamless borders but cannot fully synthesize the input samples. The results 1405 are based on the optimal tileable pattern algorithm proposed by Rodriguez-Pardo et al. [58]. This approach is not able to handle some of these challenging cases. The results 1404 are based on the work on tileable texture synthesis by Moritz et al. [53], using PatchMatch to generate compelling seamless borders but is not always capable of synthesizing the input textures, as shown in the third row. The results 1407 based on this disclosure favor keeping high-level and bigger semantic structures of the textures, resulting in larger and more varied textures.

In the various embodiments described, this disclosure provides a deep parametric texture synthesis framework capable of synthesizing tileable textures. The results obtained with the illustrative implementation embodiment show that methods and systems according to this disclosure can generate visually pleasing results for images with different levels of stochasticity. In contrast with prior approaches, systems and methods according to this disclosure are capable of exploiting properties of deep neural networks for generating seamless textures, and provide the opportunity for end-to-end tileable texture synthesis without the need for manual input. The comparisons with previous approaches show that embodiments according to this invention can provide higher-quality results, while being able to synthesize multiple maps at the same time, which greatly increases the applicability of these textures for surface-based renderers. The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. These modules may be implemented in server-based systems interacting with client systems over a computer network, such as the Internet, over which the results obtained with the modules are communicated to the client systems for output to users. For example, in computer graphics applications, realistic graphics with modeled materials, such as fabrics, are computed at the servers and communicated to client systems for display. Alternatively, the modules may be implemented in client systems, for example, in design applications or client-based graphics applications, such as for example computer gaming applications.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

REFERENCES

The following references are incorporated herein for all purposes:

[1] Adib Akl, Charles Yaacoub, Marc Donias, Jean-Pierre Da Costa, and Christian Germain. A survey of exemplar-based texture synthesis methods. Computer Vision and Image Understanding, 172:12-24, 2018. 2

[2] Yuki M. Asano, Christian Rupprecht, and Andrea Vedaldi. A critical analysis of self-supervision, or what we can learn from a single image, 2019. 3

[3] Connelly Barnes, Eli Shechtman, Adam Finkelstein, and Dan B Goldman. Patchmatch: A randomized correspondence algorithm for structural image editing. ACM Transactions on Graphics (ToG), 28(3):24, 2009. 2

[4] Connelly Barnes, Fang-Lue Zhang, Liming Lou, Xian Wu, and Shi-Min Hu. Patchtable: Efficient patch queries for large datasets and applications. ACM Transactions on Graphics (ToG), 34(4):1-10, 2015. 2

[5] Urs Bergmann, Nikolay Jetchev, and Roland Vollgraf. Learning texture manifolds with the periodic spatial gan. arXiv preprint arXiv:1705.06566, 2017. 2, 3

[6] Brent Burley and Walt Disney Animation Studios. Physically-based shading at disney. In ACM SIGGRAPH, volume 2012, pages 1-7. vol. 2012, 2012. 3

[7] Yunjey Choi, Minje Choi, Munyoung Kim, Jung-Woo Ha, Sunghun Kim, and Jaegul Choo. StarGAN: Unified Generative Adversarial Networks for Multi-Domain Image-to-Image Translation. Technical report. 3

[8] Dengxin Dai, Hayko Riemenschneider, and Luc Van Gool. The synthesizability of texture examples. In Proceedings of the IEEE/CVF Conference on Computer Vision and Pattern Recognition (CVPR), pages 3027-3034, 2014. 5, 8

[9] Soheil Darabi, Eli Shechtman, Connelly Barnes, Dan B. Goldman, and Pradeep Sen. Image melding: Combining inconsistent images using patch-based synthesis. ACM Transactions on Graphics (ToG), 31(4):1-10, 2012. 2

[10] Jeremy S De Bonet. Multiresolution sampling procedure for analysis and synthesis of texture images. In Proceedings of the 24th annual conference on Computer graphics and interactive techniques, pages 361-368, 1997. 2

[11] Tali Dekel, Tomer Michaeli, Michal Irani, and William T. Freeman. Revealing and modifying non-local variations in a single image. ACM Transactions on Graphics (Proc. SIG-GRAPH Asia), 2015. 8

[12] Valentin Deschaintre, Miika Aittala, Fredo Durand, George Drettakis, and Adrien Bousseau. Single-image SVBRDF capture with a rendering-aware deep network. ACM Transactions on Graphics (ToG), 37(4), 2018. 3

[13] Valentin Deschaintre, Miika Aittala, Fredo Durand, George Drettakis, and Adrien Bousseau. Flexible svbrdf capture with a multi-image deep network. In Computer Graphics Forum, volume 38, pages 1-13, 2019. 3

[14] Alexey Dosovitskiy and Thomas Brox. Generating images with perceptual similarity metrics based on deep networks. In Advances in neural information processing systems, pages 658-666, 2016. 2

[15] Alexei A. Efros and William T. Freeman. Image quilting for texture synthesis and transfer. In Proceedings of the 28th annual conference on Computer graphics and interactive techniques, pages 341-346, 2001. 1, 2, 7, 8

[16] Alexei A. Efros and Thomas K. Leung. Texture synthesis by non-parametric sampling. In Proceedings of the IEEE/CVF International Conference on Computer Vision (ICCV), volume 2, pages 1033-1038. IEEE, 1999. 2

[17] Anna Frühstück, Ibraheem Alhashim, and Peter Wonka. TileGAN: Synthesis of large-scale non-homogeneous textures. ACM Transactions on Graphics (ToG), 38(4), 4 2019. 2, 4, 5

[18] Bruno Galerne, Ares Lagae, Sylvain Lefebvre, and George Drettakis. Gabor noise by example. ACM Transactions on Graphics (ToG), 31(4):1-9, 2012. 1

[19] Leon Gatys, Alexander S Ecker, and Matthias Bethge. Texture synthesis using convolutional neural networks. In Advances in neural information processing systems, pages 262-270, 2015. 2

[20] Leon A Gatys, Alexander S Ecker, and Matthias Bethge. Image style transfer using convolutional neural networks. In Proceedings of the IEEE/CVF Conference on Computer Vision and Pattern Recognition (CVPR), pages 2414-2423, 2016. 2

[21] Leon A. Gatys, Alexander S. Ecker, and Matthias Bethge. Image Style Transfer Using Convolutional Neural Networks. In Proceedings of the IEEE/CVF Conference on Computer Vision and Pattern Recognition (CVPR), volume 2016-Decem, pages 2414-2423, 6 2016. 4

[22] Leon A Gatys, Alexander S Ecker, Matthias Bethge, Aaron Hertzmann, and Eli Shechtman. Controlling perceptual factors in neural style transfer. In Proceedings of the IEEE/CVF Conference on Computer Vision and Pattern Recognition (CVPR), pages 3985-3993, 2017.2

[23] Guillaume Gilet, Basile Sauvage, Kenneth Vanhoey, Jean-Michel Dischler, and Djamchid Ghazanfarpour. Local random-phase noise for procedural texturing. ACM Transactions on Graphics (ToG), 33(6):1-11, 2014. 1

[24] Ian J. Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in Neural Information Processing Systems, volume 3, pages 2672-2680. Neural information processing systems foundation, 6 2014. 4

[25] P Guehl, R Allègre, J-M Dischler, B Benes, and E Galin. Semi-procedural textures using point process texture basis functions. In Computer Graphics Forum, volume 39, pages 159-171, 2020. 1

[26] Geoffrey Guingo, Basile Sauvage, Jean-Michel Dischler, and Marie-Paule Cani. Bi-layer textures: A model for synthesis and deformation of composite textures. In Computer Graphics Forum, volume 36, pages 111-122, 2017. 1

[27] Yu Guo, Cameron Smith, Miloš Hašan, Kalyan Sunkavalli, and Shuang Zhao. Materialgan: Reflectance capture using a generative svbrdf model. ACM Transactions on Graphics (ToG), 39(6):254:1-254:13, 2020. 1

[28] Kaiming He, Xiangyu Zhang, Shaoqing Ren, and Jian Sun. Delving deep into rectifiers: Surpassing human-level performance on imagenet classification. In Proceedings of the IEEE/CVF Conference on Computer Vision and Pattern Recognition (CVPR), pages 1026-1034, 2015. 3

[29] Kaiming He, Xiangyu Zhang, Shaoqing Ren, and Jian Sun. Deep residual learning for image recognition. In Proceedings of the IEEE/CVF Conference on Computer Vision and Pattern Recognition (CVPR), volume 2016-Decem, pages 770-778, 2016.4

[30] David J Heeger and James R Bergen. Pyramid-based texture analysis/synthesis. In Proceedings of the 22nd annual conference on Computer graphics and interactive techniques, pages 229-238, 1995. 2

[31] Eric Heitz and Fabrice Neyret. High-performance by example noise using a histogram-preserving blending operator. Proceedings of the ACM on Computer Graphics and Interactive Techniques, 1(2):1-25, 2018. 1

[32] Eric Heitz, Kenneth Vanhoey, Thomas Chambon, and Laurent Belcour. Pitfalls of the gram loss for neural texture synthesis in light of deep feature histograms. arXiv preprint arXiv:2006.07229, 2020. 7

[33] Yiwei Hu, Julie Dorsey, and Holly Rushmeier. A novel framework for inverse procedural texture modeling. ACM Transactions on Graphics (ToG), 38(6):1-14, 2019. 1

[34] Phillip Isola, Jun-Yan Zhu, Tinghui Zhou, and Alexei A. Efros. Image-to-image translation with conditional adversarial networks. In Proceedings of the IEEE/CVF Conference on Computer Vision and Pattern Recognition (CVPR), pages 5967-5976, 2017.4

[35] Michael Janner, Jiajun Wu, Tejas D Kulkarni, Ilker Yildirim, and Josh Tenenbaum. Self-supervised intrinsic image decomposition. In Advances in Neural Information Processing Systems, pages 5936-5946, 2017. 4, 7

[36] Nikolay Jetchev, Urs Bergmann, and Roland Vollgraf. Texture synthesis with spatial generative adversarial networks. arXiv preprint arXiv:1611.08207, 2016. 2

[37] Justin Johnson, Alexandre Alahi, and Li Fei-Fei. Perceptual losses for real-time style transfer and superresolution. In Proceedings of the European Conference on Computer Vision (ECCV), 2016. 2

[38] Tero Karras, Timo Aila, Samuli Laine, and Jaakko Lehtinen. Progressive growing of gans for improved quality, stability, and variation. In International Conference on Learning Representations, 2018. 4

[39] Tero Karras, Samuli Laine, and Timo Aila. A stylebased generator architecture for generative adversarial networks. In Proceedings of the IEEE/CVF Conference on Computer Vision and Pattern Recognition (CVPR), pages 4401-4410, 2019. 2

[40] Tero Karras, Samuli Laine, Miika Aittala, Janne Hellsten, Jaakko Lehtinen, and Timo Aila. Analyzing and improving the image quality of stylegan. In Proceedings of the IEEE/CVF Conference on Computer Vision and Pattern Recognition (CVPR), pages 8110-8119, 2020.2

[41] Alexandre Kaspar, Boris Neubert, Dani Lischinski, Mark Pauly, and Johannes Kopf. Self-Tuning Texture Optimization. In Computer Graphics Forum, volume 34, pages 349-359, 2015. 2

[42] Diederik P. Kingma and Jimmy Lei Ba. Adam: A method for stochastic optimization. Technical report, 2015. 6

[43] Vivek Kwatra, Irfan Essa, Aaron Bobick, and Nipun Kwatra. Texture optimization for example-based synthesis. In ACM Transactions on Graphics (ToG), volume 24, pages 795-802. ACM, 2005. 1, 2

[44] Vivek Kwatra, Arno Schödl, Irfan Essa, Greg Turk, and Aaron Bobick. Graphcut textures: image and video synthesis using graph cuts. ACM Transactions on Graphics (ToG), 22(3):277-286, 2003. 2

[45] Christian Ledig, Lucas Theis, Ferenc Huszár, Jose Caballero, Andrew Cunningham, Alejandro Acosta, Andrew Aitken, Alykhan Tejani, Johannes Totz, Zehan Wang, and Wenzhe Shi. Photo-realistic single image super-resolution using a generative adversarial network. Proceedings of the IEEE/CVF Conference on Computer Vision and Pattern Recognition (CVPR), 2017-Janua: 105-114, 9 2017. 4

[46] Louis Lettry, Michal Perdoch, Kenneth Vanhoey, and Luc Van Gool. Repeated pattern detection using cnn activations. In 2017 IEEE Winter Conference on Applications of Computer Vision (WACV), pages 47-55. IEEE, 2017. 5

[47] Zhengqin Li, Mohammad Shafiei, Ravi Ramamoorthi, Kalyan Sunkavalli, and Manmohan Chandraker. Inverse rendering for complex indoor scenes: Shape, spatiallyvarying lighting and svbrdf from a single image. In Proceedings of the IEEE/CVF Conference on Computer Vision and Pattern Recognition (CVPR), pages 2475-2484, 2020. 1, 2, 7, 8

[48] Zhengqi Li and Noah Snavely. Learning intrinsic image decomposition from watching the world. In Proceedings of the IEEE Conference on Computer Vision and Pattern Recognition (CVPR), June 2018. 4, 7

[49] Zhengqin Li, Kalyan Sunkavalli, and Manmohan Chandraker. Materials for masses: Svbrdf acquisition with a single mobile phone image. In Proceedings of the European Conference on Computer Vision (ECCV), pages 72-87, 2018. 1

[50] Guilin Liu, Rohan Taori, Ting-Chun Wang, Zhiding Yu, Shiqiu Liu, Fitsum A Reda, Karan Sapra, Andrew Tao, and Bryan Catanzaro. Transposer: Universal texture synthesis using feature maps as transposed convolution filter. arXiv preprint arXiv:2007.07243, 2020. 2, 7

[51] Morteza Mardani, Guilin Liu, Aysegul Dundar, Shiqiu Liu, Andrew Tao, and Bryan Catanzaro. Neural ffts for universal texture image synthesis. Advances in Neural Information Processing Systems, 33, 2020. 2

[52] Joseph Mellor, Jack Turner, Amos Storkey, and Elliot J. Crowley. Neural architecture search without training, 2020. 7

[53] Joep Moritz, Stuart James, Tom S. F. Haines, Tobias Ritschel, and Tim Weyrich. Texture stationarization: Turning photos into tileable textures. In Eurographics Symposium on Geometry Processing, volume 36, pages 177-188, 2017. 1, 2, 5, 7, 8

[54] Hyeonseob Nam and Hyo Eun Kim. Batch-instance normalization for adaptively style-invariant neural networks. Technical report, 2018. 3

[55] Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Köpf, Edward Yang, Zach DeVito, Martin Raison, Alykhan Tejani, Sasank Chilamkurthy, Benoit Steiner, Lu Fang, Junjie Bai, and Soumith Chintala. PyTorch: An Imperative Style, High-Performance Deep Learning Library. 12 2019. 6

[56] Javier Portilla and Eero P. Simoncelli. A parametric texture model based on joint statistics of complex wavelet coefficients. International Journal of Computer Vision, 40(1):49-70, 2000. 2

[57] Lara Raad, Axel Davy, Agnès Desolneux, and Jean-Michel Morel. A survey of exemplar-based texture synthesis. Annals of Mathematical Sciences and Applications, 3(1):89-148, 2018. 2

[58] Carlos Rodriguez-Pardo, Sergio Suja, David Pascual, Jorge Lopez-Moreno, and Elena Garces. Automatic extraction and synthesis of regular repeatable patterns. Computers and Graphics (Pergamon), 83:33-41, 10 2019. 1, 2, 3, 4, 5, 6, 7, 8

[59] Olaf Ronneberger, Philipp Fischer, and Thomas Brox. U-net: Convolutional networks for biomedical image segmentation. In International Conference on Medical image computing and computer-assisted intervention, pages 234-241. Springer, 2015. 4

[60] Edgar Schonfeld, Bernt Schiele, and Anna Khoreva. A u-net based discriminator for generative adversarial networks. In Proceedings of the IEEE/CVF Conference on Computer Vision and Pattern Recognition (CVPR), pages 8207-8216, 2020. 5, 7

[61] Tamar Rott Shaham, Tali Dekel, and Tomer Michaeli. Singan: Learning a generative model from a single natural image. In Proceedings of the IEEE/CVF International Conference on Computer Vision (ICCV), October 2019. 3

[62] Assaf Shocher, Shai Bagon, Phillip Isola, and Michal Irani. Ingan: Capturing and retargeting the "dna" of a natural image. In Proceedings of the IEEE/CVF International Conference on Computer Vision (ICCV), October 2019. 3

[63] Assaf Shocher, Nadav Cohen, and Michal Irani. "zero-shot" super-resolution using deep internal learning. In Proceedings of the IEEE/CVF Conference on Computer Vision and Pattern Recognition (CVPR), June 2018. 3

[64] Xavier Snelgrove. High-resolution multi-scale neural texture synthesis. In SIGGRAPH Asia 2017 Technical Briefs, pages 1-4. 2017. 2

[65] Dmitry Ulyanov, Vadim Lebedev, Andrea Vedaldi, and Victor S. Lempitsky. Texture networks: Feed-forward synthesis of textures and stylized images. In ICML, volume 1, page 4, 2016. 3

[66] Dmitry Ulyanov, Andrea Vedaldi, and Victor Lempitsky. Instance normalization: The missing ingredient for fast stylization. arXiv preprint arXiv:1607.08022, 2016. 3

[67] Dmitry Ulyanov, Andrea Vedaldi, and Victor Lempitsky. Instance Normalization: The Missing Ingredient for Fast Stylization. 7 2016. 3

[68] Dmitry Ulyanov, Andrea Vedaldi, and Victor Lempitsky. Deep image prior. In Proceedings of the IEEE/CVF Conference on Computer Vision and Pattern Recognition (CVPR), June 2018. 3

[69] Ye Yu and William A P Smith. Inverserendernet: Learning single image inverse rendering. In Proceedings of the IEEE/CVF Conference on Computer Vision and Pattern Recognition (CVPR), pages 3155-3164, 2019. 4, 7

[70] Yang Zhou, Huajie Shi, Dani Lischinski, Minglun Gong, Johannes Kopf, and Hui Huang. Analysis and controlled synthesis of inhomogeneous textures. In Computer Graphics Forum, volume 36, pages 199-212, 2017. 2

[71] Yang Zhou, Zhen Zhu, Xiang Bai, Dani Lischinski, Daniel Cohen-Or, and Hui Huang. Non-stationary texture synthesis by adversarial expansion. ACM Transactions on Graphics (ToG), 37(4), July 2018. 2, 3, 4, 6, 7, 8

What is claimed is:

1. A method for synthesizing a tileable texture of a computer model of a physical texture for visual computing applications, the method comprising:

training a neural engine module to generate a texture from a non-tileable input;

processing an input texture with the trained neural engine module, the neural engine module comprising a generative neural network with a plurality of layers, the processing including transforming a tensor output from an one layer of the plurality of layers and providing the transformed tensor as input to an another one layer of the plurality of layers; and outputting from the neural engine module a tileable texture, wherein transforming the tensor comprises optimizing the tensor within the generative neural network according to a tileability metric.

2. The method of claim 1, wherein the input texture is a non-tileable texture stack comprising one or more images with spatially-coherent information.

3. The method of claim 2, wherein the one or more images include at least one of an albedo map, a normals map, a specular map, or a roughness map.

4. The method of claim 1, wherein the training of the neural engine module is done using a single non-tileable texture stack.

5. The method of claim 1, wherein the training of the neural engine module is done using a dataset comprising a plurality of texture stacks.

6. The method of claim 1, wherein the training of the neural engine module is done using an adversarial approach.

7. The method of claim 1, wherein the training of the neural network module comprises training the generative neural network by receiving a texture stack as input and learning to double a spatial extent of the input texture stack.

8. The method of claim 1, wherein the training of the neural network module is fully self-supervised.

9. The method of claim 1, wherein the plurality of layers of the generative neural network are fully convolutional.

10. The method of claim 1, wherein the one layer of the plurality of layers is any layer of the plurality of layers other than the another layer and the another layer is any other layer of the plurality of layers executed after the one layer.

11. The method of claim 1, wherein the plurality of layers of the generative neural network is split into a first set of layers and a second set of layers, and further wherein the tensor is output from the one layer in the first set of layers and the transformed tensor is provided as input to the another one layer in the second set of layers.

12. The method of claim 11, wherein the first set of layers comprises one or more encoders and the second set of layers comprises one or more decoders.

13. The method of claim 1, wherein the tensor within the generative neural network is a random vector.

14. The method of claim 1, wherein the tensor within the generative neural network is a latent space representation output by the one layer of the plurality of layers.

15. The method of claim 14, wherein the latent space representation output by the one layer of the plurality of layers is an output of a convolutional block.

16. The method of claim 1, wherein the transforming of the tensor output from the one layer further comprises manipulating a latent space representation within the generative neural network for generating the tileable texture.

17. The method of claim 16, further comprising optimizing the latent space representation within the generative neural network according to a tileability metric.

18. The method of claim 1, wherein the transforming the tensor output from the one layer comprises concatenating a latent representation within the generative network once horizontally and once vertically to generate a concatenated latent space tensor, and passing the concatenated latent space tensor to the another layer for processing through the rest of the generative neural network to produce the tileable texture.

19. The method of claim 1, further comprising evaluating the tileable texture using a tileability metric.

20. The method of claim 19, further comprising searching for an optimal crop of an input image to generate the input texture based on the tileability metric.

21. The method of claim 19, wherein the evaluating the tileable texture using a tileability metric comprises the use of a discriminative neural network as a tileability error function.

22. The method of claim 21, wherein the discriminative network receives the tileable texture and outputs a pixel-wise estimation of a quality of the input texture.

23. The method of claim 22, wherein central horizontal and vertical search areas within the pixel-wise estimation are used for evaluating the quality of the input texture.

24. The method of claim 1, further comprising generating the input texture as a crop from an input texture stack comprising a number of texture maps, and wherein the processing the input texture further comprises:

encoding the input texture into a latent space representation; and decoding the latent space representation into the tileable texture, wherein the decoding comprises a plurality of decoders corresponding to the number of texture maps in the input texture stack.

* * * * *